(12) United States Patent
Mutlu et al.

(10) Patent No.: US 9,744,821 B2
(45) Date of Patent: Aug. 29, 2017

(54) TRAILER COUPLING

(71) Applicant: Scambia Holdings Cyprus Limited, Limassol (CY)

(72) Inventors: Ercan Mutlu, Cologne (DE); Tobias Edelmann, Stuttgart (DE)

(73) Assignee: Scambia Holdings Cyprus Limited, Limassol (CY)

( * ) Notice: Subject to any disclaimer, the term of this patent is extended or adjusted under 35 U.S.C. 154(b) by 0 days.

(21) Appl. No.: 14/969,758

(22) Filed: Dec. 15, 2015

(65) Prior Publication Data
US 2016/0176251 A1 Jun. 23, 2016

(30) Foreign Application Priority Data

Dec. 17, 2014 (DE) .......................... 10 2014 118 879

(51) Int. Cl.
| | |
|---|---|
| *B60D 1/06* | (2006.01) |
| *B60D 1/54* | (2006.01) |
| *B60D 1/62* | (2006.01) |
| *B60D 1/24* | (2006.01) |
| *B60D 1/52* | (2006.01) |

(52) U.S. Cl.
CPC ............... *B60D 1/065* (2013.01); *B60D 1/06* (2013.01); *B60D 1/246* (2013.01); *B60D 1/52* (2013.01); *B60D 1/54* (2013.01); *B60D 1/62* (2013.01)

(58) Field of Classification Search
CPC .......... B60D 1/065; B60D 1/06; B60D 1/246; B60D 1/52; B60D 1/54; B60D 1/62
See application file for complete search history.

(56) References Cited

U.S. PATENT DOCUMENTS

| | | | | |
|---|---|---|---|---|
| 6,860,503 | B2 * | 3/2005 | Aufderheide ............ | B60D 1/54 280/491.1 |
| 7,273,222 | B2 * | 9/2007 | Rampp ................. | H01R 27/02 280/491.3 |
| 2007/0007749 | A1 * | 1/2007 | Gentner .................. | B60D 1/26 280/491.1 |
| 2015/0352915 | A1 * | 12/2015 | Burkhardt ................ | B60D 1/06 280/491.3 |
| 2016/0159177 | A1 * | 6/2016 | Rimmelspacher ....... | B60D 1/06 280/491.3 |

FOREIGN PATENT DOCUMENTS

| | | |
|---|---|---|
| DE | 197 15 469 C2 | 11/1999 |
| DE | 10 2008 032 229 A1 | 1/2010 |
| DE | 10 2009 050 932 A1 | 5/2010 |
| DE | 20 2011 105552 U1 | 10/2012 |
| DE | 20 2013 000 779 U1 | 3/2014 |

* cited by examiner

*Primary Examiner* — Joseph M Rocca
*Assistant Examiner* — Marlon A Arce
(74) *Attorney, Agent, or Firm* — Reinhart Boerner Van Deuren P.C.

(57) ABSTRACT

In a trailer coupling comprising a cross member which is mountable on a rear region of a vehicle body, a pivot bearing unit arranged on the cross member, by means of which a ball neck carrying a coupling ball is pivotally mounted about a pivot axis between a working position and a rest position, and a contact unit arranged on the ball neck as well as a cable harness guided from the contact unit to a vehicle-mounted cross member and provided for connecting to a vehicle electrical supply system, it is provided that a transition portion of the cable harness which runs in a movable manner relative to the ball neck and relative to the pivot bearing unit from the ball neck to an attachment point connected fixedly to the cross member forms at least one loop which extends over an end face of the pivot bearing unit extending transversely to the pivot axis and which varies in size when transferring from the working position to the rest position or vice versa.

12 Claims, 7 Drawing Sheets

TRAILER COUPLING

CROSS REFERENCE TO RELATED PATENT APPLICATION

This patent application claims the benefit of German application number 10 2014 118 879.9 of Dec. 17, 2014, the teachings and disclosure of which are hereby incorporated in their entirety by reference thereto.

BACKGROUND OF THE INVENTION

The invention relates to a trailer coupling comprising a cross member which is mountable on a rear region of a vehicle body, a pivot bearing unit arranged on the cross member, by means of which a ball neck carrying a coupling ball is pivotally mounted about a pivot axis between a working position and a rest position, and a contact unit, in particular a plug connection unit, arranged on the ball neck for establishing an electrical plug connection to produce an electrical connection to a unit which is fixable on the ball neck, in particular to a plug of this unit, and comprising a cable harness guided from the contact unit to a vehicle-mounted cross member and provided for connecting to a vehicle electrical supply system.

Trailer couplings of this type are known from the prior art, but these have the problem of guiding the cable harness from the ball neck to a vehicle connection in a suitable manner.

SUMMARY OF THE INVENTION

This object is solved according to the invention by a trailer coupling of the above-described type, in that a transition portion of the cable harness which runs in a movable manner relative to the ball neck and relative to the pivot bearing unit from the ball neck to an attachment point connected fixedly to the cross member forms at least one loop which extends over an end face of the pivot bearing unit extending transversely to the pivot axis and which varies in size when transferring from the working position to the rest position or vice versa.

The advantage of the solution according to the invention can be seen in that, by means of the at least one loop of the transition portion, a sufficiently large manoeuvrability of the transition portion is achieved which enables a sufficiently long service life of the transition portion of the cable harness, with the numerous pivotal movements envisaged between the rest position and the working position.

It is particularly favourable if the transition portion between the ball neck and the attachment point forms two loops which extend at least in part over an end face of the pivot bearing unit and which vary with regard to their size when transferring between the working position and the rest position.

Thus, the possibility is created of keeping the mechanical load of the transition portion of the cable harness as low as possible.

It is particularly advantageous here if the transition portion between the ball neck and the attachment point is guided relative to the pivot bearing unit by a guide unit, and is configured to run freely to the ball neck on one side of the guide unit and to run freely to the attachment point on the other side of the guide unit.

The transition portion of the cable harness can be guided by the guide unit in different ways here.

In the simplest case, the guide unit can be an eyelet connected to the pivot bearing unit and guiding the transition portion of the cable harness.

A particularly favourable guiding of the transition portion of the cable harness is then possible if the guide unit has a cable harness holder receiving the transition portion at a guide point in a fixing manner and a rotary joint rotatably holding the cable harness holder, which rotary joint is connected to the pivot bearing unit.

Due to the fact that the cable harness holder is now connected to the pivot bearing unit via the rotary joint, the possibility is opened up for the transition portion of the cable harness to move such that as even a variation as possible of the at least one loop of the transition portion occurs, in particular as even a variation as possible of the two loops occurs.

Here, the rotary joint can be constructed in different ways and provide rotational movements about different rotation axes.

It is particularly advantageous if the rotary joint allows a rotation about a rotation axis running approximately parallel to the pivot axis, wherein 'approximately parallel' should be understood as meaning a deviation of up to 30°, preferably up to 20°, more preferably up to 10°, from the exact parallel.

Furthermore, it is preferably provided that the rotary joint guides the cable harness holder in a defined spacing range from the pivot bearing unit, in particular from the end face of the pivot bearing unit.

Here, the rotary joint can be constructed such that it allows a certain spacing variation.

However, it is particularly favourable if the rotary joint guides the cable harness holder at a defined spacing from the end face of the pivot bearing unit.

With regard to the configuration of the rotary joint, numerous constructional solutions are conceivable.

One advantageous solution provides that the rotary joint has a joint pin defining a joint axis, a joint pin receptacle being rotatably mounted on the joint pin.

Here, the joint pin can be provided either on the pivot bearing unit or the cable harness holder, and the joint pin receptacle can be provided either on the cable harness holder or the pivot bearing unit.

Preferably, the rotary joint is configured such that it has only a single rotation axis running approximately parallel to the pivot axis, and does not have a plurality of rotation axes.

With regard to the position of the rotation axis relative to the pivot bearing unit, no further details have been given in connection with the present explanation of the individual embodiments.

Thus, one advantageous solution provides that the rotation axis of a central region of the end face extending inside around the pivot axis is arranged on the pivot bearing unit.

Here, the central region is preferably defined in that it extends within a radius of at most 3 cm around the pivot axis.

It is more favourable if the central region extends within a radius of 2 cm around the pivot axis, and even more favourable if the central region runs within a radius of 1 cm around the pivot axis.

It is particularly favourable for the movability of the transition portion of the cable harness if the rotation axis is arranged such that it intersects the pivot axis.

A particularly simple embodiment provides that the rotation axis runs coaxially with the pivot axis.

In connection with the hitherto described embodiments of the solution according to the invention, it has not been defined in detail how the cable harness runs between the transition portion thereof and the contact unit.

A particularly favourable solution provides that the cable harness runs with a guided cable harness portion from the contact unit lying on the ball neck or in a guide on the ball neck provided for this.

Further features and advantages of the invention are the subject of the following description of an embodiment.

DETAILED DESCRIPTION OF THE INVENTION

Figure 1:
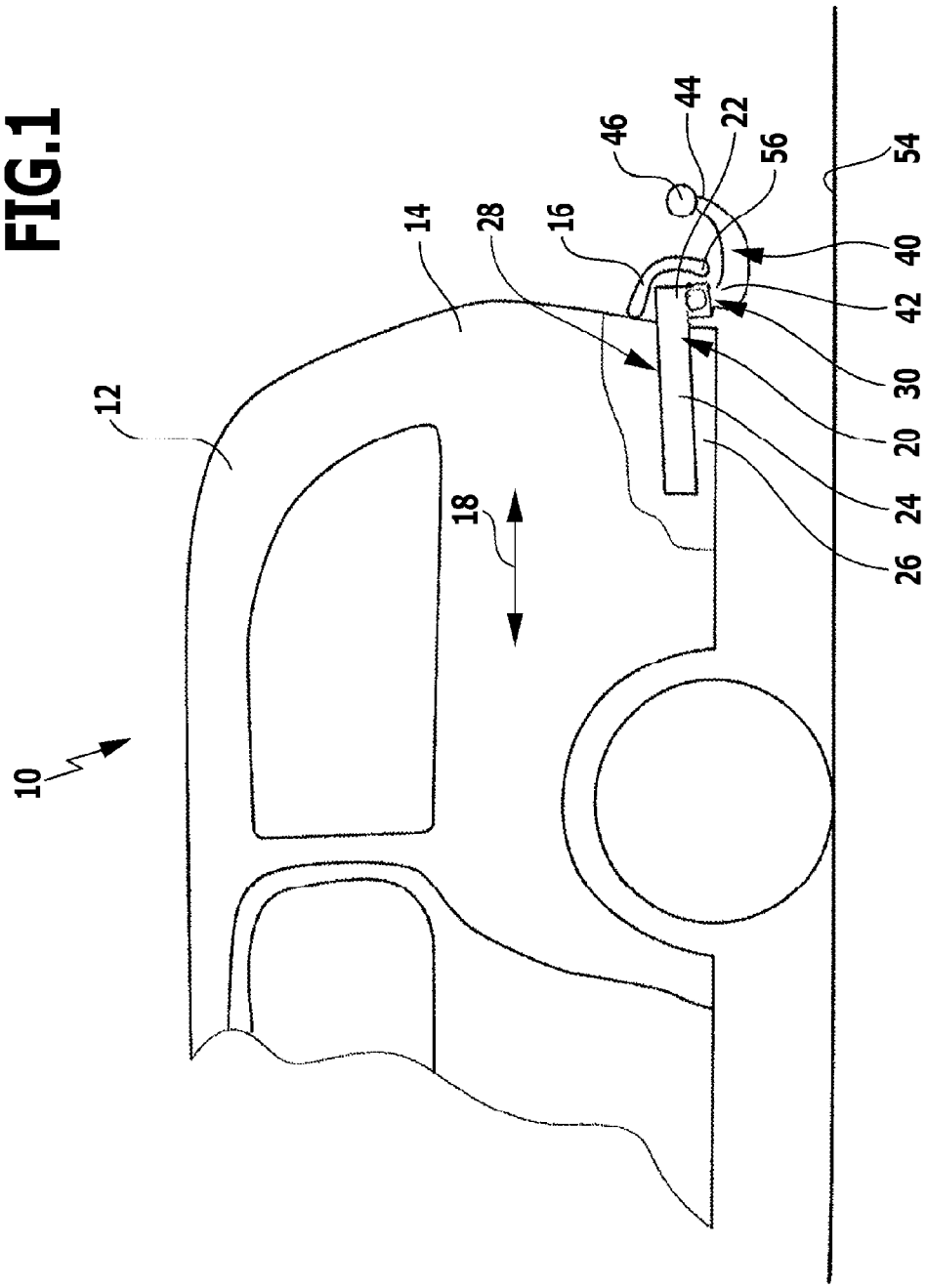
FIG. 1 is a perspective, partially broken, view of a motor vehicle with a trailer coupling according to the invention.

A motor vehicle indicated as a whole by 10 in FIG. 1 comprises a vehicle body 12 on which a trailer coupling 20 according to the invention is mounted on a rear region 14, which trailer coupling has a cross member 22 covered by a bumper unit 16 and extending transversely to a longitudinal direction 18 of the vehicle body 12 and transversely over the rear region 14, and has side supports 24 extending approximately parallel to the longitudinal direction 18 of the vehicle body along body wall portions 26 and fixed to these, the side supports together with the cross member 22 forming a supporting unit 28 which is covered partly by the vehicle body 12 and partly by the bumper unit 16.

Figure 2:
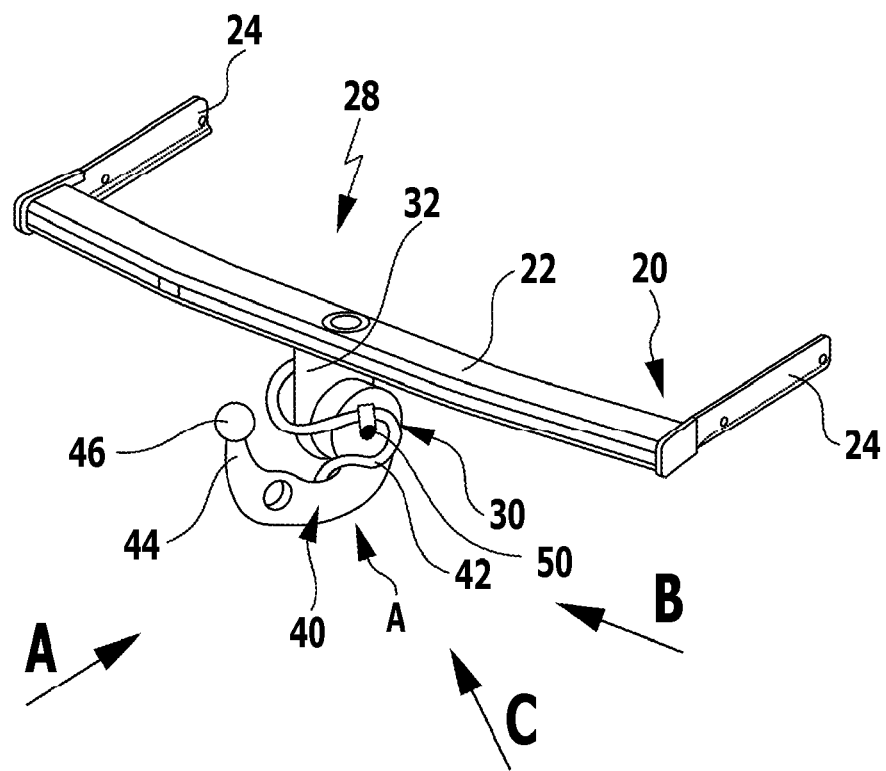
FIG. 2 is a perspective view of the embodiment of the trailer coupling according to the invention.

A supporting base 32 of a pivot bearing unit indicated as a whole by 30 is provided on the supporting unit 28, to which pivot bearing unit a ball neck indicated as a whole by 40 is connected by a first end 42, the ball neck also holding at a second end 44 a coupling ball indicated by 46, as shown in FIGS. 1 and 2.

Figure 3:
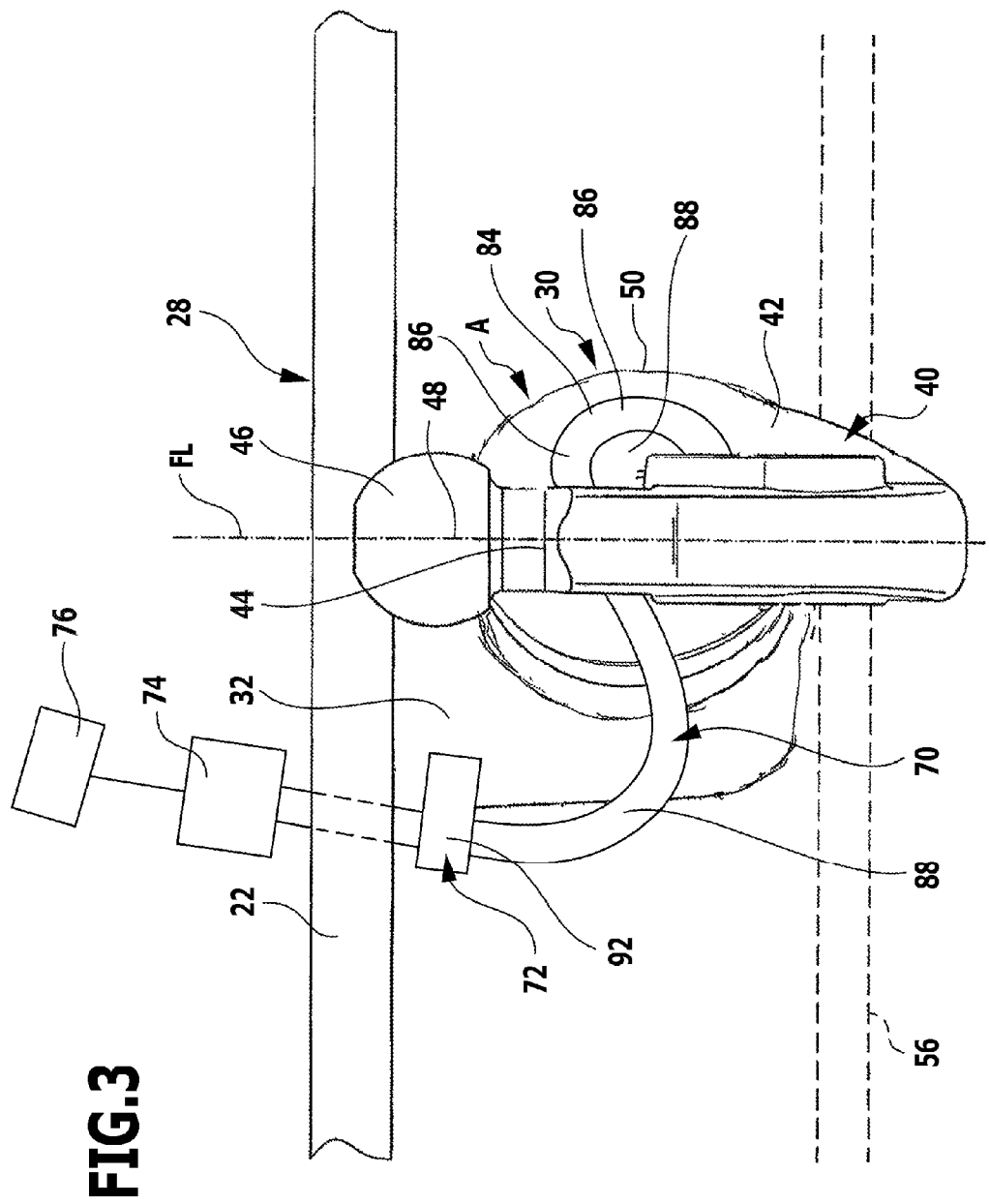
FIG. 3 is a view in the direction of the arrow A in FIG. 2.
Figure 4:
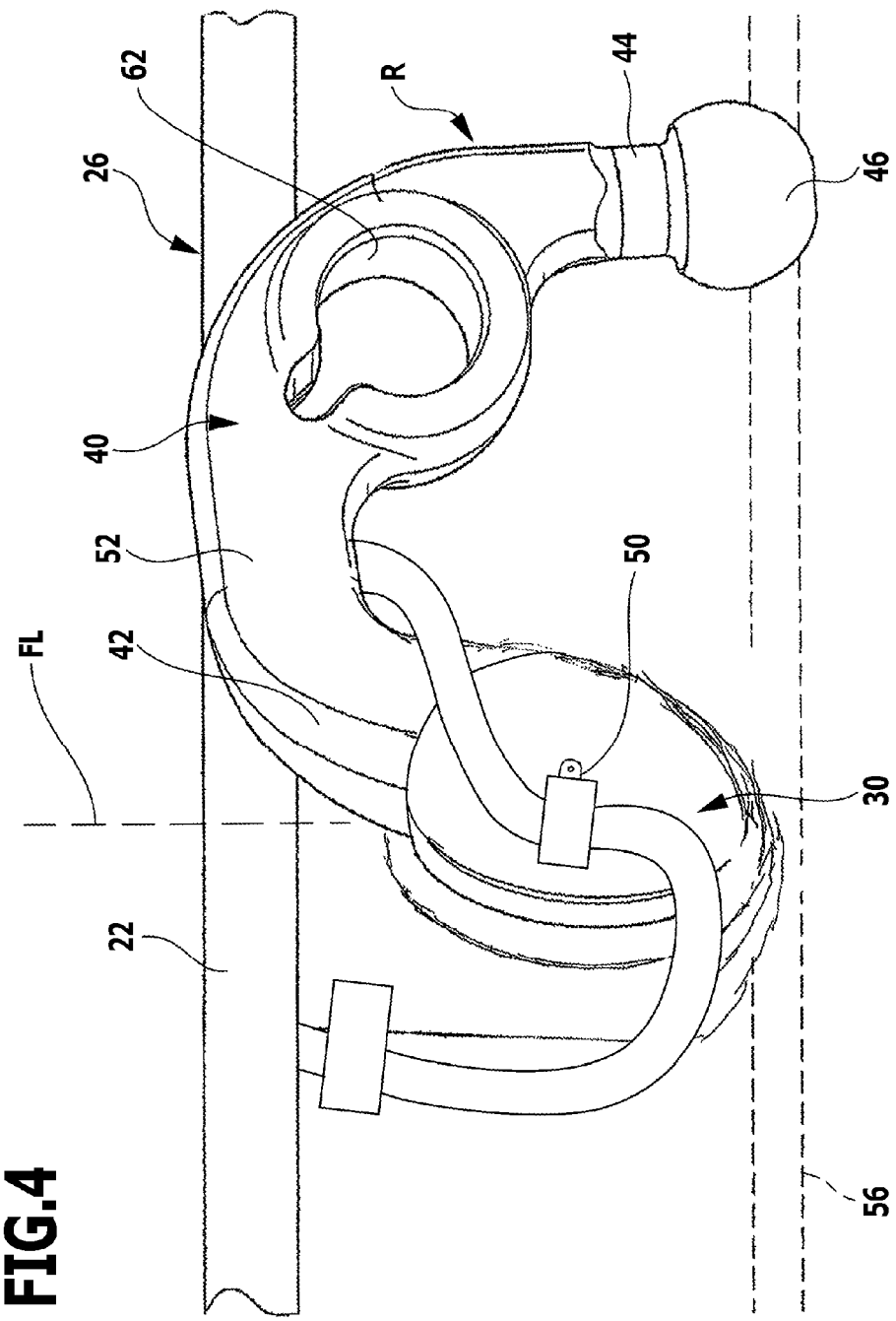
FIG. 4 is a view in the direction of the arrow B in FIG. 2.

By means of the pivot bearing unit 30, the possibility exists of pivoting the ball neck 40 from a working position A shown in FIGS. 2 and 3, in which a ball central axis 48 of the coupling ball 46 is in a vehicle longitudinal central plane FL, about a pivot axis 50 running transversely, in particular obliquely, preferably at an acute angle to the vehicle longitudinal central plane FL, into a rest position R shown in FIG. 4, in which rest position a central portion 52 of the ball neck extends transversely to the vehicle longitudinal central plane FL and the coupling ball 46 is located to the side of the vehicle longitudinal central plane FL, as shown in FIG. 4.

In particular, the ball neck 40 is arranged here in the rest position R in a position covered by the bumper unit 16 of the vehicle body 12, to the side of the vehicle longitudinal central plane FL.

With such an orientation of the pivot axis 50, the possibility exists of arranging the ball neck 40 on a side of the coupling ball 46 remote from a road surface 54, in the rest position.

The possibility exists at least of arranging the ball neck 40 in the rest position at a spacing from the road surface 54, such that it is located higher than a lower edge 56 of the bumper unit 16 in relation to the course of the road surface 54.

Figure 5:
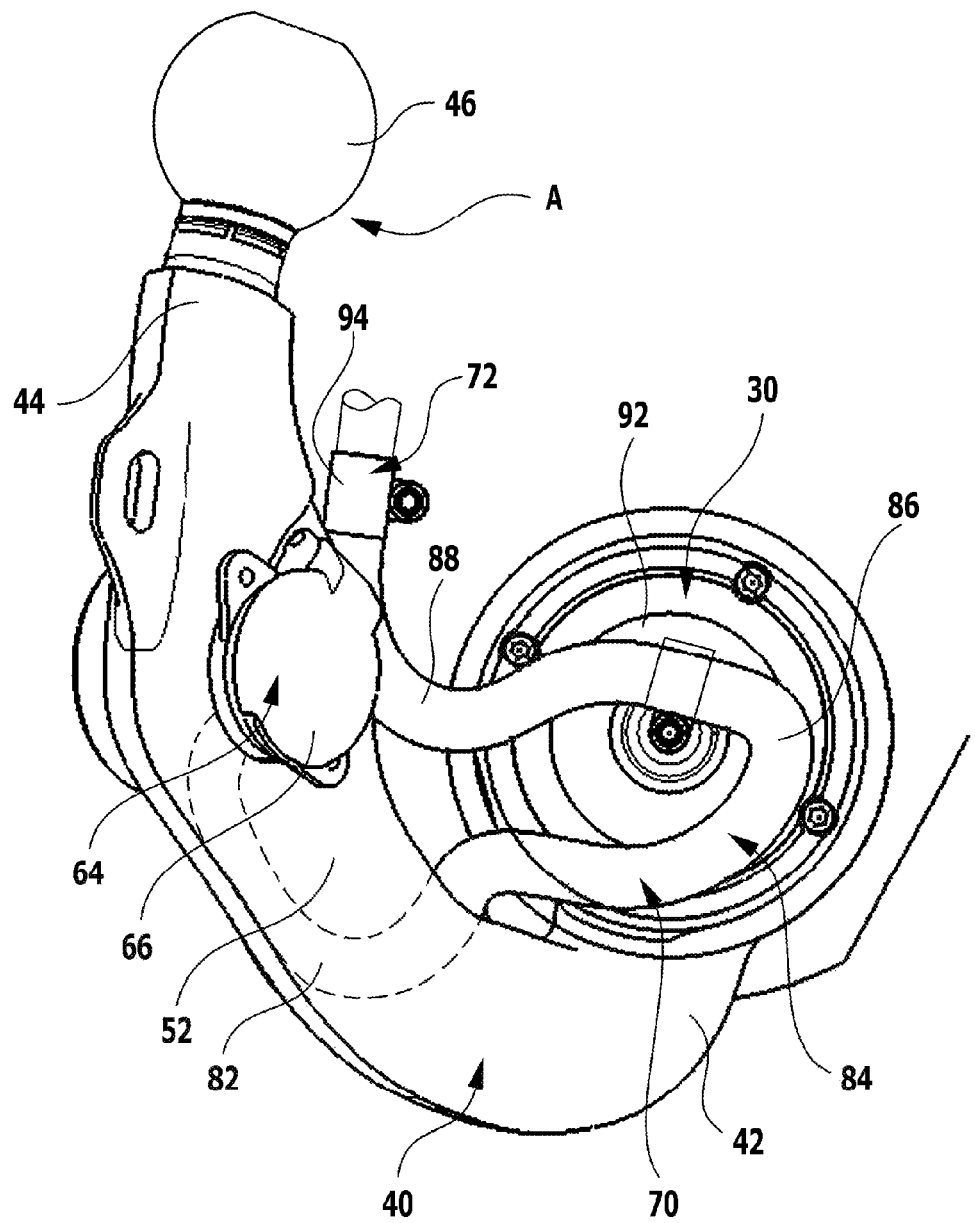
FIG. 5 is an enlarged perspective view in the direction of an arrow C in FIG. 2 in the working position.
Figure 6:
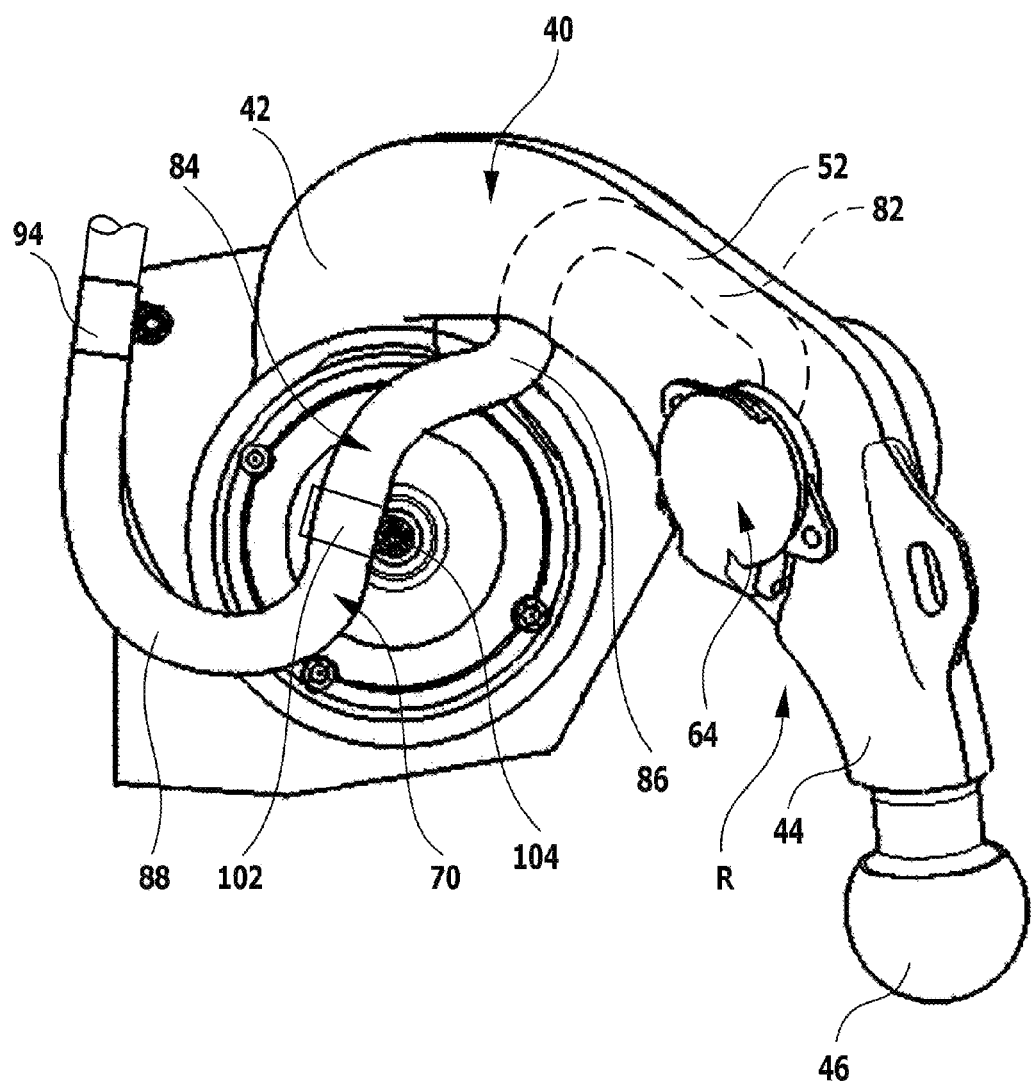
FIG. 6 is an enlarged perspective view in the direction of an arrow C in the rest position.
Figure 7:
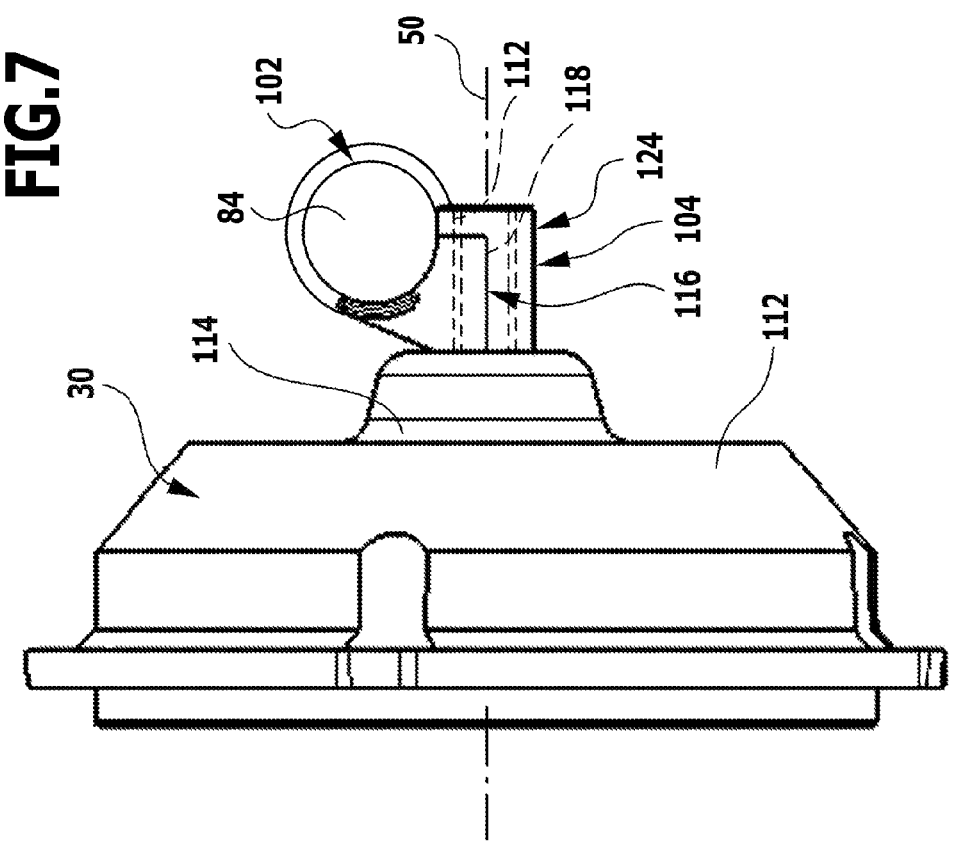
FIG. 7 is a side view of a cover of the pivot bearing unit with a cable harness holder and a rotary joint for connecting the cable harness holder to the cover.

As in particular shown in FIG. 4, the ball neck 40 is provided with a receptacle 62, in this case constructed as an opening passing through the ball neck 40, for a contact unit 64 shown in FIGS. 5 and 6, which contact unit for example passes through the receptacle 62 and has a sealing cover 66 on one side, by means of which, after opening thereof, plug contacts provided in the contact unit 64 are accessible.

Preferably, the contact unit 64 is configured as a plug connection unit or a plug socket, such that a contact plug of a trailer or of an additional device mounted on the ball neck 46, commonly used for trailer couplings, is configured to be plugged into it, in order to operate standard lights, such as for example rear lights, brake lights and indicator lights.

A cable harness indicated as a whole by 70 leads from the contact unit 64 to an attachment point 72 for the cable harness 70 connected fixedly to the cross member 22 and and thus connected fixedly to the motor vehicle 10, and from this attachment point 72 to a connection unit 74 of an electrical supply system 76 of the motor vehicle 10.

As shown in FIGS. 5 and 6, the cable harness 70 preferably runs along the ball neck 40, in particular along the central portion 52 thereof, with a guided portion 82, and subsequent to the guided portion 82, in the form of a transition portion 84 freely from the ball neck 40 in the working position and, in the rest position, in the form of at least a first loop 86 and preferably a second loop 88 at a spacing from an end face 92 of the pivot bearing unit 30 opposing the supporting base 32, up to the attachment point 72, at which the cable harness 70 is preferably fixed to the holding element 32 of the pivot bearing unit 30 by means of a cable holder 94.

When pivoting from the working position of the ball neck 40 shown in FIGS. 2, 3 and 5 into the rest position R, the shape of the loops 86 and 88 varies such that, in relation to the working position A, the size of the first loop 86 decreases when passing to the rest position, while the size of the second loop 88 increases, as is shown in a comparison of FIGS. 5 and 6.

During operation of the trailer coupling 20 according to the invention, in order to prevent damage to the cable harness 70, in particular in the region of the transition portion 84, by uncontrolled movements and by undesired catching on individual components, a cable harness holder indicated as a whole by 102 is provided, which is connected by means of a rotary joint 104 to the pivot bearing unit 30.

For this purpose, the pivot bearing unit 30 is preferably provided with a cover 112 forming the end face 92, which cover holds a joint pin 116 in a central region 114 of the end face 92, the central axis 118 thereof defining a joint axis.

The joint pin 116 engages here in a joint pin receptacle 112 which is provided in a joint sleeve 124, such that the joint sleeve 124 can be rotated about the rotation axis 118 formed by the joint pin 116.

The cable harness holder 102 is fixedly connected to the joint sleeve 124, such that the cable harness holder can be rotated by virtue of the rotary joint 104 around the rotation axis 118.

The joint pin 116 can be arranged here such that it is arranged within the central region 114 about the pivot axis 50, wherein the central region extends at most up to a radius of 2 cm around the pivot axis 50, preferably even up to a radius of only 1 cm.

Here, the preferred embodiment shown in the Figures provides that the joint pin 116 is arranged coaxially with the pivot axis 50 such that the rotation axis 118 also coincides with the pivot axis 50.

A particularly simple solution provides that the joint pin 116 has an external thread onto which the joint pin receptacle provided with an internal thread can be screwed, such that the joint pin receptacle is rotatable in the envisaged way relative to the joint pin.

In particular, the cable harness holder 102 as shown in FIGS. 5 and 6 for example, is arranged on the transition portion 84 such that it is located between the loops 86 and 88 of the transition portion 84 of the cable harness 70 and thus guides the whole transition portion 84 overall at a defined spacing from the end face 92 of the pivot bearing unit 30, and still allows a largely undisturbed movability of the transition portion 84 for variable configuration of the loops 86 and 88, wherein the cable harness holder 102 can rotate about the rotation axis 18 in particular by means of the rotary joint 104, and thus allows a variable configuration of the loops 86 and 88 when passing from the working position A to the rest position R or vice versa from the rest position R to the working position A.

The invention claimed is:

1. Trailer coupling comprising:
 a cross member which is mountable on a rear region of a vehicle body,
 a pivot bearing unit arranged on the cross member, by means of which a ball neck carrying a coupling ball is pivotally mounted about a pivot axis between a working position and a rest position,
 a contact unit arranged on the ball neck for establishing an electrical connection to a unit which is fixable on the ball neck,
 a cable harness guided from the contact unit to the cross member and provided for connecting to a vehicle electrical supply system, a transition portion of the cable harness which is movable relative to the ball neck and relative to the pivot bearing unit from the ball neck to an attachment point connected fixedly to the cross member forms at least one loop which extends over an end face of the pivot bearing unit extending transversely to the pivot axis and which varies in shape when transferring from the working position to the rest position or vice versa, and
 wherein between the ball neck and the attachment point, the transition portion is guided relative to the pivot bearing unit by a guide unit, and is configured to run freely to the ball neck on one side of the guide unit and to run freely to the attachment point on the other side of the guide unit.

2. Trailer coupling according to claim 1, wherein between the ball neck and the attachment point, the transition portion forms two loops which extend least in part over the end face of the pivot bearing unit and which vary with regard to their shape when transferring between the working position and the rest position.

3. Trailer coupling according to claim 1, wherein the guide unit has a cable harness holder receiving the transition portion at a guide point in a fixing manner and a rotary joint rotatably holding the cable harness holder, which rotary joint is connected to the pivot bearing unit.

4. Trailer coupling according to claim 3, wherein the rotary joint allows a rotation about a rotation axis running approximately parallel to the pivot axis.

5. Trailer coupling according to claim 3, wherein the rotary joint guides the cable harness holder in a defined spacing range from the pivot bearing unit, in particular from the end face of the pivot bearing unit.

6. Trailer coupling according to claim 5, wherein the rotary joint guides the cable harness holder at a defined spacing from the end face of the pivot bearing unit.

7. Trailer coupling according to claim 3, wherein the rotary joint has a joint pin defining a joint axis, a joint pin receptacle being rotatably mounted on the joint pin.

8. Trailer coupling according to claim 3, wherein a rotation axis is arranged within a central region of the end face of the pivot bearing unit extending around the pivot axis.

9. Trailer coupling according to claim 8, wherein the central region extends within a radius of at most 3 cm around the pivot axis.

10. Trailer coupling according to claim 3, wherein a rotation axis is arranged such that it intersects the pivot axis.

11. Trailer coupling according to claim 10, wherein the rotation axis extends coaxially with the pivot axis.

12. Trailer coupling comprising:
 a cross member which is mountable on a rear region of a vehicle body,
 a pivot bearing unit arranged on the cross member, by means of which a ball neck carrying a coupling ball is pivotally mounted about a pivot axis between a working position and a rest position,
 a contact unit arranged on the ball neck for establishing an electrical connection to a unit which is fixable on the ball neck,
 a cable harness guided from the contact unit to the cross member and provided for connecting to a vehicle electrical supply system a transition portion of the cable harness which is movable relative to the ball neck and relative to the Divot bearing unit from the ball neck to an attachment point connected fixedly to the cross member forms at least one loop which extends over an end face of the pivot bearing unit extending transversely to the pivot axis and which varies in shape when transferring from the working position to the rest position or vice versa, and
 wherein the cable harness runs with a guided cable harness portion from the contact unit lying on the ball neck or in a guide on the ball neck provided for this.

* * * * *

UNITED STATES PATENT AND TRADEMARK OFFICE
CERTIFICATE OF CORRECTION

PATENT NO.       : 9,744,821 B2
APPLICATION NO.  : 14/969758
DATED            : August 29, 2017
INVENTOR(S)      : Ercan Mutlu et al.

Page 1 of 1

It is certified that error appears in the above-identified patent and that said Letters Patent is hereby corrected as shown below:

Column 6, Claim 12, Line 44 currently reads "electrical supply system a transition portion" and should correctly read --electrical supply system, a transition portion--

Column 6, Claim 12, Line 46 currently reads "relative to the Divot bearing unit" and should correctly read --relative to the pivot bearing unit--

Signed and Sealed this
Seventeenth Day of October, 2017

Joseph Matal
*Performing the Functions and Duties of the*
*Under Secretary of Commerce for Intellectual Property and*
*Director of the United States Patent and Trademark Office*